United States Patent [19]

Blackwell

[11] 4,053,675

[45] Oct. 11, 1977

[54] POLY(ARYLENE SULFIDE) COATED GLAZED SURFACES

[75] Inventor: Jennings P. Blackwell, Bartlesville, Okla.

[75] Assignee: Phillips Petroleum Company, Bartlesville, Okla.

[22] Filed: May 29, 1975

[21] Appl. No.: 581,614

[52] U.S. Cl. .................. 428/426; 260/79; 260/37 R; 427/385 A; 427/387; 428/446
[51] Int. Cl.[2] ............................................ B32B 17/06
[58] Field of Search.... 260/79, 37 R; 427/385 A, 387; 428/411, 419, 426, 446

[56] References Cited
U.S. PATENT DOCUMENTS

| | | | |
|---|---|---|---|
| 3,926,873 | 12/1975 | Aishima et al. | 260/37 R |
| 3,960,805 | 6/1976 | Taylor | 260/37 R |
| 4,012,539 | 3/1977 | Davies | 260/37 R |
| 4,017,450 | 4/1977 | Bailey | 260/37 R |
| 3,894,983 | 7/1975 | Higbee | 260/79 |
| 3,728,313 | 4/1973 | Hill, Jr. et al. | 260/79 |
| 3,879,355 | 4/1975 | Blackwell | 260/79 |
| 3,884,873 | 5/1975 | Short | 260/79 |

*Primary Examiner*—Cameron K. Weiffenbach
*Attorney, Agent or Firm*—Quigg & Oberlin

[57] ABSTRACT

The adhesion of poly(arylene sulfide) coatings to glass or other substrates having glazed surfaces is improved by incorporating an effective amount of a suitable finely divided metal oxide into a poly(arylene sulfide) primer coat for the glazed substrate surface. The primer coat can subsequently be coated with a poly(arylene sulfide) release coating or with any other suitable finish coating which will adhere to the primer coat.

125 Claims, No Drawings

The adhesion of poly(arylene sulfide) coatings to glass or other substrates having glazed surfaces is improved by incorporating an effective amount of a suitable finely divided metal oxide into a poly(arylene sulfide) primer coat for the glazed substrate surface. The primer coat can subsequently be coated with a poly(arylene sulfide) release coating or with any other suitable finish coating which will adhere to the primer coat.

POLY(ARYLENE SULFIDE) COATED GLAZED SURFACES

This invention relates to the coating of glass or other material having a glazed surface. In another aspect the invention relates to coating a glazed surface with a poly(arylene sulfide) composition. In still another aspect the invention relates to a poly(arylene sulfide) primer coating for glazed substrates. In yet another aspect the invention relates to a composition for coating a glazed substrate. In another aspect the invention relates to a glazed article having a poly(arylene sulfide) composition coated thereon.

Although the use of poly(arylene sulfide) release coatings for articles made from glass, ceramic, stoneware, or other glazed surfaces as well as for coating metal substrates is known, adherence of poly(arylene sulfide) coating compositions to glazed substrates has, in general, not met with the success which has been achieved by bonding a poly(arylene sulfide) coating to a metal substrate. In this regard the poly(arylene sulfide) compositions of the prior art, like many other coating compositions known in the art, have been relatively difficult to bond to a glazed surface.

Accordingly, it is an object of the invention to provide for coating of glass or other materials having a glazed surface. Another object of the invention is to provide for coating a glazed surface with a poly(arylene sulfide) material. Still another object of the invention is to provide for coating of a glazed substrate with a poly(arylene sulfide) primer coat. Yet another object of the invention is to provide a composition for coating glazed substrates. Another object of the invention is to provide glazed substrates having a poly(arylene sulfide) composition coated thereon. A further object of the invention is to improve the adherence of a poly(arylene sulfide) coating to a glazed surface.

In accordance with the invention a suitable poly(arylene sulfide) material is combined with an effective amount of a suitable metal-containing compound for improving the adhesion of the poly(arylene sulfide) to a glazed surface. The metal-containing compound combined with the poly(arylene sulfide) can be any suitable finely divided metal oxide or another metallic compound which, under the conditions required to cure the poly(arylene sulfide) coating, will decompose to form a suitable finely divided metal oxide, or a combination of one or more metal oxides and/or one or more decompossable metallic compounds. The poly(arylene sulfide) and metal-containing compound are then coated onto a glazed substrate and the poly(arylene sulfide) is cured. The coating thus applied can then be utilized as a primer coat for the glazed substrate, and a subsequent application of a suitable release coating can be utilized to obtain a final coated substrate which has both suitable release properties on the external coating surfaces and improved adherence to the glazed substrate. Other objects, aspects, and advantages of the invention will be apparent from a study of the specification and the appended claims.

Any normally solid poly(arylene sulfide) can be used in the practice of this invention. The term poly(arylene sulfide) is meant to include not only homopolymers but also arylene sulfide copolymers, terpolymers, and the like, as well as blends of two or more such polymers. Poly(arylene sulfides) which are particularly suited for use in this invention are those having inherent viscosities in chloronaphthalene (0.2 gram polymer in 100 cc. chloronaphthalene) at 206° C. of at least about 0.08, preferably between about 0.1 and about 0.3, and more preferably between about 0.13 and about 0.23. Examples of suitable polymers are disclosed, for instance in Edmonds et al. U.S. Pat. No. 3,354,129, Nov. 21, 1967. The presently preferred polymer is poly(phenylene sulfide). Other examples of poly(arylene sulfide) are poly(4,4'-biphenylene sulfide); poly(2,4-tolylene sulfide); a copolymer from p-dichlorobenzene, 2,4-dichlorotoluene, and sodium sulfide; and blends thereof. Poly(arylene sulfide) prepared in accordance with copending application Ser. No. 495,450 filed Aug. 8, 1974, now U.S. Pat. No. 3,919,177, may also be used.

An effective amount of any suitable metal oxide or another metal-containing compound which will, under the conditions required for curing of the poly(arylene sulfide) coating used, decompose to form a suitable metal oxide can be utilized in the practice of the invention. An effective amount of such a suitable material is considered to be that amount of a particular material which, when incorporated into a poly(arylene sulfide) coating composition, will result in an improvement in adherence of the poly(arylene sulfide) composition to a glazed substrate. As used in this disclosure, the term "metal" is considered to include silicon, and the term "particle size" is considered to mean the average particle size of a material. Presently preferred metallic oxides are oxides of aluminum, antimony, iron, silicon, and zirconium having a particle size less than about $10^{-7}$ meters and metal-containing compounds which will decompose to form oxides of aluminum, antimony, iron, silicon, and zirconium having a particle size of less than about $10^{-7}$ meters under poly(arylene sulfide) curing conditions. Presently more preferred materials are the previously listed metal oxides and degradable materials which will form these oxides wherein the resulting metal oxide within the cured poly(phenylene sulfide) composition has a particle size less than about $2.5 \times 10^{-8}$ meters. Materials which are presently particularly preferred are oxides of aluminum, antimony, iron, silicon, titanium, and zirconium having a particle size less than about $10^{-8}$ meters and metal-containing compounds which will form oxides of aluminum, antimony, iron, silicon, titanium, and zirconium having a particle size less than about $10^{-8}$ meters under poly(arylene sulfide) curing conditions. Metallic compounds which will decompose to form the presently preferred metal oxides include, but are not limited to, ⅝ basic aluminum chloride ($Al_2(OH)_5Cl$), antimony oxyhydrate ($H_4Sb_2O_7$), antimony oxychloride (SbOCl), ferric chloride ($FeCl_3 \cdot 6H_2O$), hydrated silica compounds such as $SiO_2 \cdot 3H_2O$, disilicic acid ($H_2SiO_5$), titanium acetylacetonate, titanium ammonium lactate, titanium salt of polymerized butene, and ammonium zirconyl carbonate (($NH_4$)$_3ZrOH(CO_3)_3$).

The concentration of metal oxide and/or metal oxide forming material to be combined with the poly(arylene sulfide) to achieve the desired improvement in adherence to a glazed substrate can vary considerably. Due to the apparent increase in effectiveness which accompanies a decrease in metal oxide particle size, smaller amounts of the smaller particle metal oxides within the cured poly(arylene sulfide) coating may have an equal effect with larger amounts of larger particle sized metal oxides. Depending on the particular materials which are to be utilized in any given case, those skilled in the art can readily determine without undue experimentation the amount of metal oxide or metal oxide producing material which can best be utilized to optimize bonding strength to the glazed substrate, economical material utilization, or both. In general, concentrations of metal oxide within the cured poly(arylene sulfide) coating within the range of from about 10 to about 110 parts by weight per 100 parts of poly(arylene sulfide) can be expected to exhibit improves adhesion to a glazed substrate. At present, preferred concentrations of metal oxide within the poly(arylene sulfide) coating are within the range of from about 20 parts to about 100 parts by weight of metal oxide per 100 parts by weight of poly(arylene sulfide), and more preferred concentrations are within the range of from about 25 parts to about 100 parts by weight of metal oxide per 100 parts by weight of poly(arylene sulfide).

With respect to specific metal oxides, it is considered that particularly advantageous improvements in adhesion to a glazed substrate can be obtained using from about 25 to about 100 parts of zirconium oxide having an average particle size less than about $10^{-8}$ meters, from about 50 to about 100 parts of zirconium oxide having an average particle size less than about $10^{-7}$ meters, from about 25 to about 50 parts of titanium dioxide having an average particle size less than about $10^{-8}$ meters, from about 85 to about 100 parts of silicon dioxide having a particle size less than about $10^{-7}$ meters, from about 50 to about 100 parts of aluminum oxide having a particle size less than about $10^{-8}$ meters, from about 20 to about 50 parts of aluminum oxide having a particle size less than about $10^{-7}$ meters, or from about 25 to about 100 parts of iron oxide having a particle size less than about $10^{-8}$ meters, per 100 parts by weight of poly(arylene sulfide).

The substrates which can be suitably coated in accordance with the invention include glass, fused glass frit, glazed ceramic materials, glazed stoneware, and other similar glazed surfaces. Particular items which can be advantageously coated in accordance with the invention include cookware made of "Pyrex" or other similar glass materials, crockery, stoneware, or the like. Laboratory glassware, industrial ceramic materials, glazed ceramic molds or forms, and many similar glass, glass-coated, or glazed materials which are capable of withstanding the temperatures required to cure a poly(arylene sulfide) coating can be coated in accordance with the invention.

The poly(arylene sulfide) and metal oxide composition of the invention is particularly useful as a primer coat for a glazed substrate. Although the use of any suitable finish coat over such a primer coating is within the scope of the invention, a primer coating applied in accordance with the invention is particularly useful in conjunction with a subsequent release coating of a polymeric material such as polytetrafluoroethylene, poly(arylene sulfide) or the like. A preferred release coating composition for use in conjunction with the invention comprises poly(arylene sulfide), polytetrafluroethylene, and titanium dioxide. Although these constituents can be present in the release coating within various ranges as known in the art, a preferred composition comprises from about 1 to about 100 parts by weight of polytetrafluoroethylene and from about 10 to about 100 parts by weight of titanium dioxide per 100 parts by weight of poly(arylene sulfide). At present, a particularly preferred release coating composition comprises from about 10 to about 20 parts by weight polytetrafluoroethylene and from about 10 to about 50 parts by weight titanium dioxide per 100 parts by weight of poly(arylene sulfide). The poly(arylene sulfide) utilized in the release coating can be any poly(arylene sulfide) as previously defined and can be the same as or different from the poly(arylene sulfide) utilized in the primer coat. A presently preferred poly(arylene sulfide) for use in a release coating is poly(phenylene sulfide).

The substrate can be prepared by degreasing, cleaning, and drying the surface to be coated. Cleaning can be accomplished by washing or wiping with trichloroethylene, acetone, or other similar cleaners or solvents, then air drying, or wiping the surface dry. Other suitable techniques may also be used for cleaning and drying the surface to be coated. In addition to cleaning and drying, the glazed surface is preferably grit blasted in order to further improve adhesion of the poly(arylene sulfide) coating. Although the coating materials of the invention exhibit improved adhesion to a glazed substrate whether or not the substrate has been grit blasted prior to application of the coating, adhesion to those glazed surfaces which have been grit blasted is ordinarily superior to the adhesion obtained with surfaces which have not been grit blasted.

While the poly(arylene sulfide) coating can be applied to the glazed substrate surface in any manner known to the art, a preferred method is to prepare a slurry containing the poly(arylene sulfide) and then to spray coat the substrate with the slurry. Such a spray coating method is conducive to application of a coating of uniform thickness having a smooth, unbroken surface.

When a slurry is employed, any liquid can be used as the diluent provided the liquid is compatible with and inert to the other components of the slurry and to the substrate, and provided it is readily volatilized prior to or during the subsequent heating or curing treatment. Suitable liquids include water; light hydrocarbons having 5–8 carbon atoms, such as hexane, isooctane, and pentane; benzene; toluene; petroleum ether; alcohols or glycols having 1–4 carbon atoms, such as ethanol, propanol, i-propanol, ethylene glycol, butanol-1, and propylene glycol; or mixtures thereof. A wetting agent, usually a nonionic material such as alkylphenoxypolyethoxy alcohol, in the proportion of about 0.5 percent to about 1 percent by weight based on water can be used. Other suitable wetting agents are octylphenoxypolyethoxy ethanol, aliphatic polyethers, ethoxylated straight chain alcohols, nonylphenylpolyethylene glycol ether, and trimethylnonylpolyethylene glycol ether. The presently preferred liquid for use as a diluent in the preparation and application of a poly(arylene sulfide) primer coat composition slurry is water. If a source of finely divided metal oxide to be used in the primer coating composition is in the form of a colloidal suspension or solution, use of the carrier liquid in which the metal oxide or metal oxide producing compound is suspended or dissolved as a portion of the poly(arylene sulfide) slurry diluent is also presently preferred.

Preparation of a suitable slurry can be accomplished in any manner known to the art. It has been found that a suitable slurry can be obtained by ball milling the poly(arylene sulfide) and diluent for a period of time within the range of from about 2 to about 48 hours. The concentration of the poly(arylene sulfide) polymer in the carrier liquid will depend upon the particular method of coating application to be used and whether or not the metal oxide of the primer coating composition is to be ball milled with the poly(arylene sulfide). Since many of the finely divided materials which can be advantageously utilized in the practice of the invention are commonly available as a colloidal suspension, it is preferred to add such a suspension to the coating composition after ball milling of the poly(arylene sulfide) slurry so that coagulation of the colloidal solution during the milling process will not be encountered. When this technique is used the colloidal suspension may be thoroughly stirred into the poly(arylene sulfide) slurry using any suitable means capable of producing a uniform combined slurry. As a practical matter, the slurry which is to be applied to the colloidal substrate should not be so dilute that the poly(arylene sulfide) polymer particles are not closely enough associated to permit them to fuse together on melting during cure of the coating. On the other hand, the thickness of the slurry and its ease of application will impose a practical upper limit on the solids concentration. Generally, a solids content within the range of from about 10 to about 60 weight percent can be used, and best results are ordinarily obtained with a slurry that contains from about 25 to about 40 weight percent of solids based on the weight of the total slurry.

The slurry is preferably sprayed onto the glazed substrate when the substrate is at ambient temperature. With a glazed substrate which will not be damaged by spraying of a cooler slurry on to its hot surface, the substrate may be heated to a temperature of at least 400° F. (204° C.), more preferably between about 600 and about 800 ° F. (about 315 and about 427° C.) prior to application of the coating. If the substrate is heated prior to slurry application, it is preferably maintained at a temperature high enough to fuse the polymer on contact during the coating operation.

After the primer coating has been applied it is cured by heating the substrate and the coating to a temperature in the range of from about 500° to about 800° F. (260–427° C.), in an oxygen-containing atmosphere, such as air, for a time in the range of from about 5 minutes to about 12 hours or more. In general, curing at higher temperatures will require shorter curing times whereas lower temperature curing will be carried out over a longer period of time to achieve the desired results. The temperature and duration of the curing operation will also be dependent upon the nature of the sutstrate, the size or density of the substrate, the thickness of the coating, and the exact formulation of the coating. The use of primer coatings having thicknesses within the range of from about 0.5 to about 5 mils is presently preferred.

Following curing of the primer coat, the coated glazed substrate is preferably cooled before a subsequent release coating or other suitable finish coating is applied. A release coating such as the presently preferred combination of poly(phenylene sulfide), polytetrafluoroethylene, and titanium dioxide pigment can be prepared by ball milling all solid ingredients in the manner previously described for the preparation of the primer coat slurry using a suitable diluent and wetting agent as known in the art. In addition to materials such as titanium dioxide which can be used as a lightening pigment in the release coating, red iron oxide, black cobalt or iron oxide, and other similar pigment materials can be utilized to provide a desired release coating color. Although the release coating can be applied to the primer coating by any means known in the art, a preferred method of application is by spraying the slurry onto the cooled primer coat surface followed by heat curing of the release coating at an appropriate temperature and for an appropriate time sufficient to cure the particular release formulation utilized. For poly(arylene sulfide) based release coatings, the curing time and temperature for the release coating will be within the same range as the curing time and temperature for the primer coat.

In addition to release coatings prepared from poly(phenylene sulfide), release coatings of polytetrafluoroethylene and other similar release materials can be advantageously adhered to a glazed substrate by first coating the substrate with a poly(arylene sulfide) and suitable metal oxide primer coat in accordance with the invention. Other methods and techniques for applying a finish coating over the primer coating can be used. One such alternative method is to heat the substrate and primer coat to a desired finish coat curing temperature, then to dry spray the desired finish coat material onto the heated primer surface. One material which can be suitably applied by such an alternative dry spraying process is a poly(arylene sulfide) such as poly(phenylene sulfide). When such an alternative technique is utilized, curing of the finished coating is accomplished by maintaining the coated substrate at the coating temperature for a period of time sufficient to cure the finish coating.

In accordance with the invention it is possible to produce a coated glazed substrate surface having a primer coating of poly(arylene sulfide) and metal oxide which will exhibit improved adherence to the substrate. A suitable finish or release material which would not ordinarily adhere well to the glazed substrate but which will adhere strongly to the primer coating can then be coated onto the primer coat to provide the glazed substrate with a finished coating exhibiting both the desirable release properties or other desired properties of the finish coat and the improved adhesion of the primer coat.

EXAMPLE I

Experimental primer coat slurries were prepared by ball milling poly(phenylene sulfide) (PPS) and other solid ingredients overnight (approximately 16 hours) in water with a suitable surfactant. The surfactant used was selected from octylphenoxypolyethoxyethanol (Triton X-190, Rohm & Haas) for use with non-acidic primer coat compositions and ethoxylated straight chain alcohols (Triton DN-65, Rohm & Haas) for use with acidic coating compositions. About 1 percent by weight of surfactant based on the weight of water was used. Generally, the slurries contained about 35 percent by weight of solids. Those metal-containing materials which were in the form of solutions or colloidal suspensions were stirred into a ball milled slurry of poly(phenylene sulfide) in water containing the surfactant.

Finish coating formulations were prepared by ball milling a slurry of poly(phenylene sulfide), polytetrafluoroethylene, and filler pigment in the same manner that the primer coat compositions were prepared. Filler pigments were selected from titanium oxide, red iron oxide, and black iron oxide. The finish coatings contained from 10 to 20 parts by weight of polytetrafluoroethylene per 100 parts by weight of poly(phenylene sulfide) and 33 parts by weight of pigment per 100 parts by weight of poly(phenylene sulfide).

Primer coatings were applied to Pyrex casserole dishes by spraying the primer coating composition slurry onto the cleaned and grit blasted glass inner surface of the dish using a conventional spray gun. The coating, about 1 to 2 mils thick, was then dried for 10 to 15 minutes at about 200° F (93° C), then cured 30 minutes at 700° F (371° C). After cooling, the finish coating material was sprayed onto the surface of the cured primer coat. The finish coat was then dried and cured using the same procedure by which drying and curing of the primer coating material had been accomplished.

Following coating of the dishes, the durability of adhesion of the coating material to the glass substrate was tested. A first test for durability of adhesion was immersion of the coated object in a 2 percent solution of a liquid dishwashing detergent for 2 hours at a temperature of about 205° F (96° C) (just below boiling). The detergent solution was maintained at this temperature during the entire 2-hour test period with water lost from the solution by evaporation being periodically replaced. The coated object was then removed from the solution, rinsed thoroughly, and checked for tightness of adhesion.

A second test was conducted utilizing actual cooking tests of casserole recipes such as beans, macaroni and cheese, rice, corn, scalloped potatoes, and other similar casserole dishes under actual cooking use conditions. Each cooking cycle consisted of preparation of a casserole in the coated dish followed by removal of the food from the dish and washing in a dishwasher. After each cooking cycle the coating was checked for adhesion to the glass substrate.

Adhesion following the hot detergent test and cooking test was checked by probing the coated surface with a scalpel under 20X magnification to determine the ease of separation of the coating material from the glass substrate. In general, the coating was probed in only a few spots in order to avoid excessive destruction of the coating and to permit further testing of the coating. Failure of adhesion to the glass substrate was readily apparent from the scalpel probe test if the coating separated from the glass substrate in large strips. In some instances, blisters developed from water getting between the coating and the glass substrate. With transparent "pyrex" dishes, water penetration or separation of the coating was apparent when viewing the coating from the reverse side with a strong light shining through the coating. Judging of the tightness of adhesion by the scalpel test was done on a comparative basis based on the difficulty of removing the coating from the glass substrate with a scalpel.

An additional adhesion test was performed on all dishes which had withstood 10 or more cooking cycles without failure and upon other selected dishes. The second test, referred to as a cross-hatch adhesion test, was performed by making four parallel cuts approximately 1/16 inch apart in the coating, then making similar cuts at a right angle to the original cuts. A piece of Scotch cellophane tape was rubbed onto the cross-hatched area, then pulled off sharply at a 45-degree angle. Loss of coating was noted, then an attempt was made to pry the remaining coating from the cross-hatched area with a thumb nail. Adhesion was then rated as follows:

Excellent—no loss of coating from cross-hatch by tape pull or by thumb nail pry.
Good—slight loss (up to about 1/3) of coating.
Fair—about 50 percent loss of coating.
Poor—most or all of coating lost.

Tables I-III set forth the results of these tests utilizing zirconium oxide, silicon oxide, and titanium oxide respectively. Table IV contains the results of tests utilizing aluminum oxide, antimony oxide, and iron oxide. A dash in any column of the tables indicates that a particular test was not run or that adhesion was not tested. Tables I-IV indicate the composition of the primer coating only, the finish coating in each case was not varied except for pigment color, and no adhesion variations related to finish coat color were observed. For those primer coating compositions which included a metal-containing material which would decompose during curing of the primer coat, the amount of metal oxide in the cured coating resulting from the presence of the metal-containing material within the coating slurry was based on 100 percent conversion of the metal within the metal-containing material to a metal oxide. In the case of the colloidal silicon oxide metal-containing materials of Table II, the improvement obtained by the use of smaller particle size silicon oxides is apparent despite the difficulties encountered in formulating a primer coating slurry which could be suitably applied to the test dishes. The $4 \times 10^{-9}$, $1.3 \times 10^{-8}$, and $2 \times 10^{-8}$ meter average particle size colloidal oxides used were obtained as colloidal suspensions having 15 percent, 30 percent, and 50 percent respectively of silicon oxide suspended in a solution of sodium hydroxide. The $2.1 \times 10^{-8}$ meter particle size

TABLE I

| Run | Metal-containing material | Parts ZrO$_2$ per 100 parts PPS in cured coating | ZrO$_2$ average particle size (meters) | Adhesion after hot detergent test | Cooking cycles | Scalpel probe adhesion | Cross-hatch adhesion |
|---|---|---|---|---|---|---|---|
| 1 | ZrO$_2$ powder | 33 | $7.5 \times 10^{-5}$ | Failed | — | — | — |
| 2 | ZrO$_2$ powder | 100 | $7.5 \times 10^{-5}$ | Failed | — | — | — |
| 3 | ZrO$_2$ colloid | 32 | $5 \times 10^{-9}$ to $2.5 \times 10^{-8}$ | OK | 5 | Poor | — |
| 4 | ZrO$_2$ colloid | 42 | $5 \times 10^{-9}$ to $2.5 \times 10^{-8}$ | OK | 5 | Good | Fair |
| 5 | ZrO$_2$ colloid | 80 | $5 \times 10^{-9}$ to $2.5 \times 10^{-8}$ | OK | 15 | Good | Poor (brittle) |
| 6 | ZrO$_2$ colloid | 100 | $5 \times 10^{-9}$ to $2.5 \times 10^{-8}$ | OK | 16 | Good | Poor (brittle) |
| 7 | (NH$_4$)$_2$ZrOH(CO$_3$)$_3$ | 27 | $< 10^{-8}$ | OK | 16 | Good | Poor |
| 8 | (NH$_4$)$_2$ZrOH(CO$_3$)$_3$ | 100 | $< 10^{-8}$ | OK | 10 | Good | Excellent |
| 9 | ZrO$_2$ powder + (NH$_4$)$_2$ZrOH(CH$_3$)$_3$ | 33 / 33 | $7.5 \times 10^{-5}$ / $< 10^{-8}$ | OK | 10 | Good | Excellent |

TABLE II

| Run | Metal-containing material | Parts SiO₂ per 100 parts PPS in cured coating | SiO₂ average particle size (meters) | Adhesion after hot detergent test | Cooking cycles | Scalpel probe adhesion | Cross-hatch adhesion |
|---|---|---|---|---|---|---|---|
| 10 | $SiO_2$ powder | 33 | $7.5 \times 10^{-5}$ | — | 2 | Failed | — |
| 11 | $SiO_2$ powder | 100 | $7.5 \times 10^{-5}$ | — | 5 | Failed | — |
| 12 | $SiO_2$ powder | 200 | $7.5 \times 10^{-5}$ | — | 3 | Failed | — |
| 13 | $SiO_2$ powder | 33 | $2.5 \times 10^{-5}$ | — | 5 | Poor (blistered) | — |
| 14 | $SiO_2$ powder | 100 | $2.5 \times 10^{-5}$ | OK | 3 | Poor | — |
| 15 | $SiO_2$ colloid | 100 | $2.1 \times 10^{-6}$ | OK | 10 | Good | Fair |
| 16 | $SiO_2$ colloid | 15 | $2 \times 10^{-6}$ | Failed | — | — | — |
| 17 | $SiO_2$ colloid | 75 | $2 \times 10^{-6}$ | Poor | — | — | — |
| 18 | $SiO_2$ colloid | 100 | $2 \times 10^{-6}$ | OK | 1 | Fair | Fair |
| 19 | $SiO_2$ colloid | 100 | $1.9 \times 10^{-8}$ | OK | 10 | Good | Good |
| 20 | $SiO_2$ colloid | 15 | $1.3 \times 10^{-8}$ | Failed | — | — | — |
| 21 | $SiO_2$ colloid | 33 | $1.3 \times 10^{-8}$ | Failed | — | — | — |
| 22 | $SiO_2$ colloid | 50 | $1.3 \times 10^{-8}$ | Poor | — | — | — |
| 23 | $SiO_2$ colloid | 100 | $1.3 \times 10^{-8}$ | OK | 10 | Good | Good |
| 24 | $SiO_2$ colloid | 17 | $4 \times 10^{-9}$ | Failed* | — | — | — |
| 25 | $SiO_2$ colloid | 33 | $4 \times 10^{-9}$ | Failed* | — | — | — |
| 26 | $SiO_2$ colloid | 40 | $4 \times 10^{-9}$ | Poor* | — | — | — |
| 27 | $SiO_2$ colloid | 100 | $4 \times 10^{-9}$ | Poor* | — | — | — |

*Colloidal dispersion SiO₂ concentration insufficient to permit formulation of a slurry thick enough to be effectively coated on the substrate.

TABLE III

| Run | Metal-containing material | Parts TiO₂ per 100 parts PPS in cured coating | TiO₂ average particle size (meters) | Adhesion after hot detergent test | Cooking cycles | Scalpel probe adhesion | Cross-hatch adhesion |
|---|---|---|---|---|---|---|---|
| 28 | $TiO_2$ powder | 33 | $7.5 \times 10^{-5}$ | — | 5 | Failed | — |
| 29 | $TiO_2$ powder | 100 | $.5 \times 10^{-6}$ to $1 \times 10^{-6}$ | Failed (blistered) | — | — | — |
| 30 | $TiO_2$ powder | 100 | $.5 \times 10^{-6}$ to $1 \times 10^{-6}$ | Weak | — | — | Poor |
| 31 | $TiO_2$ powder | 100 | $.5 \times 10^{-6}$ to $1 \times 10^{-6}$ | Weak | — | — | Poor |
| 32 | Titanium acetylacetonate | 29 | $<10^{-8}$ | OK | — | Good | — |
| 33 | Titanium ammonium lactate | 35 | $<10^{-8}$ | OK | — | Excellent | — |
| 34 | Titanium salt of polymerized butene | 27.5 | $<10^{-8}$ | OK | — | Excellent | — |

TABLE IV

| Run | Metal-containing material | Parts metal oxide per 100 parts PPS in cured coating | Metal oxide average particle size (meters) | Adhesion after hot detergent test | Cooking cycles | Scalpel probe adhesion | Cross-hatch adhesion |
|---|---|---|---|---|---|---|---|
| 35 | $Al_2O_3$ powder | 25 | $1 \times 10^{-5}$ | Failed (blistered) | — | — | — |
| 36 | $Al_2O_3$ colloid | 25 | $1 \times 10^{-7}$ | OK | 10 | Good | Good |
| 37 | $Al_2(OH)_2Cl_4$ | 100* | $<10^{-8}$ | Weak | — | — | Poor |
| 38 | $Al_2(OH)_xCl_2$ | 100* | $<10^{-8}$ | Weak | — | — | Poor |
| 39 | $Al_2(OH)_xCl$ | 100 | $<10^{-8}$ | OK | 10 | Good | Excllent |
| 40 | $Sb_2O_3$ colloid | 100 | $1 \times 10^{-7}$ | OK | 12 | Good | Good |
| 41 | $FeCl_3 \cdot 6H_2O$ | 100 | $<10^{-8}$ | OK | — | Good (finish coating did not bond tightly) | — |
| 42 | $FeCl_3 \cdot 6H_2O$ | 25 | $<10^{-8}$ | OK | — | Good (finish coat bonded tightly) | — |

*Assumes substantially complete conversion of Al to Al₂O₃ during curing. Lack of available oxygen or formation of undesirable compounds apparently caused failure of conversion to Al₂O₃ and/or interference with adhesion.

silicon oxide was available as a suspension of 40 percent silicon oxide in a solution of ammonium hydroxide, and the $1.9 \times 10^{-8}$ meter particle size material was available as a colloidal suspension having 34 percent silicon oxide dispersed in an acid (pH 3.1) stabilizing medium. The necessity, therefore, of incorporating a substantial amount of carrier or stabilizing liquid into the poly(phenylene sulfide) slurry caused coating difficulties, particularly with the $4 \times 10^{-9}$ size material, which should ordinarily not be encountered utilizing other sources of similarly sized silica.

EXAMPLE II

Two pieces of glazed crockery were grit blasted and cleaned. The first piece of crockery was coated with slurry containing 100 parts ⅚ basic aluminum chloride per 100 parts poly(phenylene sulfide) in accordance with the procedure of Example I. The coating was cured for 45 minutes at a temperature of 700° F. (371° C.). The second piece of crockery was coated with a conventional release coating comprising 100 parts poly(phenylene sulfide), 33 parts titanium oxide, and 15 parts polytetrafluoroethylene and was similarly cured. Both crockery dishes were immersed in a 2 percent solution of detergent in water at about 200° F. for 2 hours, after which they were removed and rinsed. The crock coated with the primer coat of the invention was well bonded and could not be removed by the cross-hatch test of Example I. The standard release coating of the second crock peeled off easily in large pieces. A third piece of similar crockery was coated using the same procedure and coating material as the first piece of crockery. After cooling a release coating of 100 parts poly(phenylene sulfide), 33 parts titanium oxide, and 20 parts polytetrafluoroethylene was applied to its surface and cured 1 hour at 700° F. (371° C.). Upon cooling the coating appeared and felt smooth. The third crock was maintained in a 2 percent detergent solution for 2 hours at 200° F. (93° C.), then removed and rinsed. No peeling or blistering of the coating was observed and no coating material was removed during performance of the cross-hatch test of Example I.

EXAMPLE III

A set of ceramic molds for forming dipped rubber gloves were cleaned by heating to a temperature of 370° C. for about 6 hours followed by cooling in the oven overnight. When cool, the molds were washed with acetone and grit blasted. A primer coat comprising 100 parts poly(phenylene sulfide) and 100 parts 5/6 basic aluminum chloride was prepared and applied using the procedure of Example I. The molds were then put in a cold oven which was heated to 370° C., held at this temperature for 30 minutes, then allowed to slowly cool to room temperature. A release coating, comprising on a weight basis, 100 parts poly(phenylene sulfide), 33 parts titanium dioxide, and 10 parts polytetrafluoroethylene was applied over the primer coating. The release coating was cured in a manner similar to the curing of the primer coating by slowly heating the molds to 370° C. holding them at this temperature for 30 minutes, and slowly cooling them. The mold coatings were of good appearance and uniformity with no observed failure of adhesion to the mold.

Reasonable modifications and variations are possible within the scope of the foregoing disclosure and the appended claims to the invention.

I claim:

1. A coated article comprising:
a substrate having a glazed surface, and
a cured first coating adhered to said glazed surface, said first coating comprising poly(arylene sulfide) and an effective amount of a metal oxide suitable for improving adhesion of poly(arylene sulfide) to said glazed surface, said metal oxide having a particle size less than about $10^{-8}$ meters.

2. An article in accordance with claim 1 wherein said metal oxide comprises at least one metal oxide selected from the group consisting of oxides of aluminum, antimony, iron, silicon, titanium, and zirconium.

3. An article in accordance with claim 1 wherein said metal oxide comprises zirconium oxide.

4. An article in accordance with claim 1 wherein said metal oxide comprises antimony oxide.

5. An article in accordance with claim 1 additionally comprising a cured finish coating applied to said cured first coating.

6. An article in accordance with claim 5 wherein said finish coating comprises poly(arylene sulfide).

7. An article in accordance with claim 1 wherein said metal oxide is present within said first coating in a concentration of from about 20 to about 100 parts by weight per 100 parts by weight of said poly(arylene sulfide).

8. An article in accordance with claim 7 wherein said poly(arylene sulfide) of said first coating comprises poly(phenylene sulfide).

9. An article in accordance with claim 8 wherein said substrate is selected from the group consisting of glass, fused glass frit, glazed ceramic, and glazed stoneware.

10. An article in accordance with claim 8 wherein said metal oxide comprises antimony oxide.

11. An article in accordance with claim 8 wherein said metal oxide comprises silicon dioxide.

12. An article in accordance with claim 8 wherein said metal oxide comprises zirconium oxide.

13. An article in accordance with claim 12 wherein said zirconium oxide is present within said first coating in a concentration of from about 25 to about 100 parts by weight per 100 parts by weight of said poly(phenylene sulfide).

14. An article in accordance with claim 8 wherein said metal oxide comprises titanium dioxide.

15. An article in accordance with claim 14 wherein said titanium dioxide is present within said first coating in a concentration of from about 25 to about 50 parts by weight of titanium dioxide per 100 parts by weight of poly(phenylene sulfide).

16. An article in accordance with claim 8 wherein said metal oxide comprises iron oxide.

17. An article in accordance with claim 16 wherein said iron oxide is present within said first coating in a concentration of from 25 to about 100 parts by weight per 100 parts by weight of poly(phenylene sulfide).

18. An article in accordance with claim 8 wherein said metal oxide comprises aluminum oxide.

19. An article in accordance with claim 18 wherein said aluminum oxide is present within said first coating in a concentration of from about 50 to about 100 parts by weight per 100 parts by weight of poly(phenylene sulfide).

20. A coated article comprising:
a substrate having a glazed surface, and
a cured first coating adhered to said glazed surface, said first coating comprising poly(arylene sulfide) and an effective amount of a metal oxide suitable for improving adhesion of poly(arylene sulfide) to said glazed surface, said metal oxide having a particle size less than about $10^{-7}$ meters and being selected from the group consisting of the oxides of aluminum, antimony, iron, silicon, and zirconium.

21. An article in accordance with claim 20 wherein said metal oxide comprises zirconium oxide.

22. An article in accordance with claim 20 wherein said metal oxide comprises antimony oxide.

23. An article in accordance with claim 20 additionally comprising a cured finish coating applied to said cured first coating.

24. An article in accordance with claim 23 wherein said finish coating comprises poly(arylene sulfide).

25. An article in accordance with claim 20 wherein said metal oxide is present within said first coating in a concentration of from about 20 to about 100 parts by weight per 100 parts by weight of said poly(arylene sulfide).

26. An article in accordance with claim 25 wherein said poly(arylene sulfide) of said first coating comprises poly(phenylene sulfide).

27. An article in accordance with claim 26 wherein said substrate is selected from the group consisting of glass, fused glass frit, glazed ceramic, and glazed stoneware.

28. An article in accordance with claim 26 wherein said metal oxide comprises iron oxide.

29. An article in accordance with claim 26 wherein said metal oxide comprises zirconium oxide.

30. An article in accordance with claim 29 wherein said zirconium oxide is present within said first coating in a concentration of from about 50 to about 100 parts by weight of poly(phenylene sulfide).

31. An article in accordance with claim 26 wherein said metal oxide comprises antimony oxide.

32. An article in accordance with claim 31 wherein said antimony oxide is present within said first coating in a concentration of about 100 parts by weight per 100 parts by weight of poly(phenylene sulfide).

33. An article in accordance with claim 26 wherein said metal oxide comprises aluminum oxide.

34. An article in accordance with claim 33 wherein said aluminum oxide is present within said first coating in a concentration of from about 20 to about 50 parts by weight per 100 parts by weight of poly(phenylene sulfide).

35. An article in accordance with claim 34 wherein the concentration of said aluminum oxide is about 25 parts by weight per 100 parts by weight of poly(phenylene sulfide).

36. An article in accordance with claim 26 wherein said metal oxide comprises silicon dioxide.

37. An article in accordance with claim 36 wherein said silicon dioxide is present within said first coating in a concentration of from about 85 to about 100 parts by weight per 100 parts by weight of poly(phenylene sulfide).

38. An article in accordance with claim 37 wherein the concentration of said silicon dioxide is about 100 parts by weight per 100 parts by weight of poly(phenylene sulfide).

39. A method for coating a glazed surface with a poly(arylene sulfide) coating, said method comprising:
applying to said glazed surface a first coating composition comprising poly(arylene sulfide) and an effective amount of at least one metal-containing composition for improving adhesion to said glazed surface, said at least one metal-containing suitable composition being selected from the group consisting of metal oxides having a particle size less than about $10^{-8}$ meters, and metal compounds which will form metal oxides having a particle size less than about $10^{-8}$ meters under poly(arylene sulfide) curing conditions; and
heating the thus-coated glazed surface to cure said first coating composition.

40. A method in accordance with claim 39 wherein the metal of said metal-containing compositions is selected from the group consisting of aluminum, antimony, iron, silicon, titanium, and zirconium.

41. A method in accordance with claim 39 wherein said metal-containing composition is selected from the group consisting of ⅝ basic aluminum chloride, ferric chloride, titanium acetylacetonate, titanium ammonium lactate, titanium salt of polymerized butene, ammonium zirconyl carbonate, aluminum oxide, antimony oxide, iron oxide, silicon oxide, titanium oxide, and zirconium oxide.

42. A method in accordance with claim 39 wherein said metal-containing composition is present within said first coating composition in an amount suitable to provide a concentration of from about 20 to about 100 parts by weight of metal oxide per 100 parts by weight of said poly(arylene sulfide) in the cured first coating composition.

43. A method in accordance with claim 39 wherein said metal-containing composition comprises an amount of ammonium zirconyl carbonate sufficient to provide from about 25 to about 100 parts by weight of zirconium oxide per 100 parts by weight of poly(arylene sulfide) in the cured first coating composition.

44. A method in accordance with claim 39 wherein said metal-containing composition comprises an amount of a compound selected from the group consisting of titanium acetylacetonate, titanium ammonium lactate, and titanium salt of polymerized butene sufficient to provide from about 25 to about 100 parts by weight of titanium dioxide per 100 parts by weight of poly(arylene sulfide) in the cured first coating composition.

45. A method in accordance with claim 39 wherein said metal-containing composition comprises an amount of ferric chloride sufficient to provide from about 25 to about 100 parts by weight of iron oxide per 100 parts by weight of poly(arylene sulfide) in the cured first coating composition.

46. A method in accordance with claim 39 wherein said metal-containing composition comprises an amount of ⅝ basic aluminum chloride sufficient to provide from about 20 to about 100 parts by weight of aluminum oxide per 100 parts by weight of poly(arylene sulfide) in the cured first coating composition.

47. A method in accordance with claim 39 wherein the metal of said metal-containing composition comprises zirconium.

48. A method in accordance with claim 39 wherein said metal-containing composition comprises from about 25 to about 100 parts by weight of zirconium oxide per 100 parts by weight of poly(arylene sulfide).

49. A method in accordance with claim 39 wherein the metal of said metal-containing composition comprises titanium.

50. A method in accordance with claim 39 wherein said metal-containing composition comprises an amount of a compound selected from the group consisting of titanium acetylacetonate, titanium ammonium lactate, and titanium salt of polymerized butene sufficient to provide from about 25 to about 50 parts by weight of titanium dioxide per 100 parts by weight of poly(arylene sulfide) in the cured first coating composition.

51. A method in accordance with claim 39 wherein the metal of said metal-containing composition comprises iron.

52. A method in accordance with claim 39 wherein the metal of said metal-containing composition comprises aluminum.

53. A method in accordance with claim 39 wherein said metal-containing composition comprises from about 50 to about 100 parts by weight of aluminum oxide per 100 parts by weight of poly(arylene sulfide).

54. A method in accordance with claim 39 wherein the metal of said metal-containing composition comprises antimony.

55. A method in accordance with claim 39 wherein said metal-containing composition comprises antimony oxide.

56. A method in accordance with claim 39 wherein the metal of said metal-containing composition comprises silicon.

57. A method in accordance with claim 39 wherein said metal-containing composition comprises silicon dioxide.

58. A method in accordance with claim 39 additionally comprising applying a release coating composition to the cured first coating composition; and curing said release coating composition.

59. A method in accordance with claim 58 wherein said release coating composition comprises poly(arylene sulfide), titanium dioxide, and polytetra-fluoroethylene.

60. A method for coating a glazed surface with a poly(arylene sulfide) coating, said method comprising:
applying to said glazed surface a first coating composition comprising poly(arylene sulfide) and an effective amount of at least one metal-containing composition for improving adhesion to said glazed surface, said at least one metal-containing suitable composition being selected from the group consisting of oxides of aluminum, antimony, iron, silicon, and zirconium having a particle size less than about $10^{-7}$ meters, and compounds containing aluminum, antimony, iron, silicon, or zirconium which will form oxides of their respective metals having a particle size less than about $10^{-7}$ meters under poly(arylene sulfide) curing conditions; and
heating the thus-coated glazed surface to cure said first coating composition.

61. A method in accordance with claim 60 wherein said metal-containing composition is present within said first coating composition in an amount suitable to provide a concentration of from about 25 to about 100 parts by weight of metal oxide per 100 parts by weight of said poly(arylene sulfide) in the cured first coating composition.

62. A method in accordance with claim 60 wherein the particle size of said oxides is less than about $2.5 \times 10^{-8}$ meters.

63. A method in accordance with claim 60 wherein said metal-containing composition comprises an amount of ammonium zirconyl carbonate sufficient to provide from about 25 to about 100 parts by weight of zirconium oxide per 100 parts by weight of poly(aryl-ene sulfide) in the cured first coating composition.

64. A method in accordance with claim 60 wherein said metal-containing composition comprises an amount of ferric chloride sufficient to provide from about 25 to about 100 parts by weight of iron oxide per 100 parts by weight of poly(arylene sulfide) in the cured first coating composition.

65. A method in accordance with claim 60 wherein said metal-containing composition comprises an amount of 5/6 basic aluminum chloride sufficient to provide from about 20 to about 100 parts by weight of aluminum oxide per 100 parts by weight of poly(arylene sulfide) in the cured first coating composition.

66. A method in accordance with claim 60 wherein said metal-containing composition comprises from about 25 to about 100 parts by weight of iron oxide per 100 parts by weight of poly(arylene sulfide).

67. A method in accordance with claim 60 wherein the metal of said metal-containing composition comprises zirconium.

68. A method in accordance with claim 60 wherein said metal-containing composition comprises zirconium oxide.

69. A method in accordance with claim 60 wherein said metal-containing composition comprises from about 25 to about 100 parts by weight of zirconium oxide per 100 parts by weight of poly(arylene sulfide.)

70. A method in accordance with claim 60 wherein said metal-containing composition comprises from about 50 to about 100 parts by weight of zirconium oxide per 100 parts by weight of poly(arylene sulfide).

71. A method in accordance with claim 60 wherein the methal of said metal-containing composition comprises iron.

72. A method in accordance with claim 60 wherein the metal of said metal-containing composition comprises aluminum.

73. A method in accordance with claim 60 wherein said metal-containing composition comprises from about 20 to about 50 parts by weight of aluminum oxide per 100 parts by weight of poly(arylene sulfide).

74. A method in accordance with claim 60 wherein said metal-containing composition comprises about 25 parts by weight of aluminum oxide per 100 parts by weight of poly(arylene sulfide).

75. A method in accordance with claim 60 wherein the metal of said metal-containing composition comprises antimony.

76. A method in accordance with claim 60 wherein said metal-containing composition comprises antimony oxide.

77. A method in accordance with claim 60 wherein said metal-containing composition comprises about 100 parts by weight of anitmony oxide per 100 parts by weight of poly(arylene sulfide).

78. A method in accordance with claim 60 wherein the metal of said metal-containing composition comprises silicon.

79. A method in accordance with claim 60 wherein said metal-containing composition comprises silicon dioxide.

80. A method in accordance with claim 60 wherein said metal-containing composition comprises from about 85 to about 100 parts by weight of silicon dioxide per 100 parts by weight of poly(arylene sulfide).

81. A method in accordance with claim 60 wherein said metal-containing composition comprises about 100 parts by weight of silicon dioxide per 100 parts by weight of poly(arylene sulfide).

82. A method in accordance with claim 60 additionally comprising applying a release coating composition to the cured first coating composition; and curing said release coating composition.

83. A method in accordance with claim 82 wherein said release coating composition comprises poly(arylene sulfide), titanium dioxide, and polytetra-fluoroethylene.

84. A composition comprising:
poly(arylene sulfide); and
an effective amount of at least one metal-containing compound suitable for improving adhesion of said poly(arylene sulfide) to a glazed surface, said at least one metal-containing compound being selected from the group consisting of metal oxides having a particle size less than about $10^{-8}$ meters, and metal compounds which will form metal oxides having a particle size less than about $10^{-8}$ meters under poly(arylene sulfide) curing conditions.

85. A composition in accordance with claim 84 wherein the metal of said metal-containing compounds is selected from the group consisting of aluminum, antimony, iron, silicon, titanium, and zirconium.

86. A composition in accordance with claim 84 wherein said metal-containing compounds comprise compounds selected from the group consisting of 5/6 basic aluminum chloride, ferric chloride, titanium acetylacetonate, titanium ammonium lactate, titanium salt of polymerized butene, ammonium zirconyl carbonate, aluminum oxide, antimony oxide, iron oxide, silicon oxide, titanium oxide, and zirconium oxide.

87. A composition in accordance with claim 84 wherein said metal-containing compound is present within said composition in an amount suitable to provide a concentration of from about 20 to about 100 parts by weight of metal oxide per 100 parts by weight of said poly(arylene sulfide) in the cured composition.

88. A composition in accordance with claim 84 wherein said metal-containing compound comprises an amount of ammonium zirconyl carbonate sufficient to provide from about 25 to about 100 parts by weight of zirconium oxide per 100 parts by weight of poly(arylene sulfide) in the cured composition.

89. A composition in accordance with claim 84 wherein said metal-containing compound comprises an amount of a compound selected from the group consisting of titanium acetylacetonate, titanium ammonium lactate, and titanium salt of polymerized butene sufficient to provide from about 25 to about 100 parts by weight of titanium dioxide per 100 parts by weight of poly(arylene sulfide) in the cured composition.

90. A composition in accordance with claim 84 wherein said metal containing compound comprises an amount of ferric chloride sufficient to provide from about 25 to about 100 parts by weight of iron oxide per 100 parts by weight of poly(arylene sulfide) in the cured composition.

91. A composition in accordance with claim 84 wherein said metal-containing compound comprises an amount 5/6 basic aluminum chloride sufficient to provide from about 20 to about 100 parts by weight of aluminum oxide per 100 parts by weight of poly(arylene sulfide) in the cured composition.

92. A composition in accordance with claim 84 wherein said poly(arylene sulfide) comprises poly(phenylene sulfide).

93. A composition in accordance with claim 84 wherein the metal of said metal-containing compound comprises zirconium.

94. A composition in accordance with claim 84 wherein said metal-containing compound comprises from about 25 to about 100 parts by weight of zirconium oxide per 100 parts by weight of poly(arylene sulfide).

95. A composition in accordance with claim 84 wherein the metal of said metal-containing compound comprises titanium.

96. A composition in accordance with claim 84 wherein said metal-containing compound comprises an amount of a compound selected from the group consisting of titanium acetylacetonate, titanium ammonium lactate, and titanium salt of polymerized butene sufficient to provide from about 25 to about 50 parts by weight of titanium dioxide per 100 parts by weight of poly(arylene sulfide) in the cured composition.

97. A composition in accordance with claim 84 wherein the metal of said metal-containing compound comprises iron.

98. A composition in accordance with claim 84 wherein said metal-coating compound comprises from about 25 to about 100 parts by weight of iron oxide per 100 parts by weight of poly(arylene sulfide).

99. A composition in accordance with claim 84 wherein the metal of said metal-containing compound comprises aluminum.

100. A composition in accordance with claim 84 wherein said metal-containing compound comprises from about 50 to about 100 parts by weight of aluminum oxide per 100 parts by weight of poly(arylene sulfide).

101. A composition in accordance with claim 84 wherein the metal of said metal-containing compound comprises antinomy.

102. A composition in accordance with claim 84 wherein said metal-containing compound comprises antimony oxide.

103. A composition in accordance with claim 84 wherein the metal of said metal-containing compound comprises silicon.

104. A composition in accordance with claim 84 wherein said metal-containing compound comprises silicon dioxide.

105. A composition comprising:
poly(arylene sulfide); and
an effective amount of at least one metal-containing compound suitable for improving adhesion of said poly(arylene sulfide) to a glazed surface, said at least one metal-containing compound being selected from the group consisting of oxides of aluminum, antimony, iron, and zirconium having a particle size less than about $10^{-7}$ meters, and compounds containing aluminum, antimony, iron, or zirconium which will form oxides of their respective metals having a particle size less than about $10^{-7}$ meters under poly(arylene sulfide) curing conditions.

106. A composition in accordance with claim 105 wherein said metal-containing compound is present within said first composition in an amount suitable to provide a concentration of from about 20 to about 100 parts by weight of metal oxide per 100 parts by weight of said poly(arylene sulfide) in the cured composition.

107. A composition in accordance with claim 105 wherein said metal-containing compound comprises an amount of ammonium zirconyl carbonate sufficient to provide from about 25 to about 100 parts by weight of zirconium oxide per 100 parts by weight of poly(arylene sulfide) in the cured composition.

108. A composition in accordance with claim 105 wherein said metal-containing compound comprises an amount of ferric chloride sufficient to provide from about 25 to about 100 parts by weight of iron oxide per 100 parts by weight of poly(arylene sulfide) in the cured composition.

109. A composition in accordance with claim 105 wherein said metal-containing compound comprises an amount of 5/6 basic aluminum chloride sufficient to provide from about 20 to about 100 parts by weight of aluminum oxide per 100 parts by weight of poly(arylene sulfide) in the cured composition.

110. A composition in accordance with claim 105 wherein said poly(arylene sulfide) comprises poly(phenylene sulfide).

111. A composition in accordance with claim 105 wherein the metal of said metal-containing compound comprises zirconium.

112. A composition in accordance with claim 105 wherein said metal-containing compound comprises zirconium oxide.

113. A composition in accordance with claim 105 wherein said metal-containing compound comprises from about 25 to about 100 parts by weight of zirconium oxide per 100 parts by weight of poly(arylene sulfide).

114. A composition in accordance with claim 105 wherein said metal-containing compound comprises from about 50 to about 100 parts by weight of zirconium ozide per 100 parts by weight of poly(arylene sulfide).

115. A composition in accordance with claim 105 wherein the metal of said metal-containing compound comprises iron.

116. A composition in accordance with claim 105 wherein the metal of said metal-containing compound comprises aluminum.

117. A composition in accordance with claim 105 wherein said metal-containing compound comprises from about 20 to about 50 parts by weight of aluminum oxide per 100 parts by weight of poly(arylene sulfide).

118. A composition in accordance with claim 105 wherein said metal-containing compound comprises about 25 parts by weight of aluminum oxide per 100 parts by weight of poly(arylene sulfide).

119. A composition in accordance with claim 105 wherein the metal of said metal-containing compound comprises antimony.

120. A composition in accordance with claim 105 wherein said metal-containing compound comprises antimony oxide.

121. A composition in accordance with claim 105 wherein said metal-containing compound comprises about 100 parts by weight of antimony oxide per 100 parts by weight of poly(arylene sulfide).

122. A composition in accordance with claim 105 wherein the metal of said metal-containing compound comprises silicon.

123. A composition in accordance with claim 105 wherein said metal-containing compound comprises silicon dioxide.

124. A composition in accordance with claim 105 wherein said metal-containing compound comprises from about 85 to about 100 parts by weight of silicon dioxide per 100 parts by weight of poly(arylene sulfide).

125. A composition in accordance with claim 105 wherein said metal-containing compound comprises about 100 parts by weight of silicon dioxide per 100 parts by weight of poly(arylene sulfide).

* * * * *